United States Patent
Kazama

(10) Patent No.: US 7,564,211 B2
(45) Date of Patent: Jul. 21, 2009

(54) ELECTRIC POWER GENERATION CONTROL SYSTEM AND ELECTRIC POWER GENERATION CONTROL METHOD FOR FUEL CELL

(75) Inventor: Isamu Kazama, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 706 days.

(21) Appl. No.: 10/544,022

(22) PCT Filed: Mar. 23, 2004

(86) PCT No.: PCT/JP2004/003972

§ 371 (c)(1),
(2), (4) Date: Jul. 29, 2005

(87) PCT Pub. No.: WO2004/093288

PCT Pub. Date: Oct. 28, 2004

(65) Prior Publication Data

US 2006/0141305 A1     Jun. 29, 2006

(30) Foreign Application Priority Data

Apr. 10, 2003   (JP) .............................. 2003-106495

(51) Int. Cl.
*H01M 10/44* (2006.01)
(52) U.S. Cl. .............................. 320/101; 429/9; 429/23
(58) Field of Classification Search ................. 320/101; 429/9, 23
See application file for complete search history.

(56) References Cited

U.S. PATENT DOCUMENTS 4,202,933 A     5/1980   Reiser et al.

(Continued)

FOREIGN PATENT DOCUMENTS

JP           6-243882 A      9/1994

(Continued)

OTHER PUBLICATIONS

S.R. Vosen et al., "Hybrid Energy Storage Systems for Stand-alone Electric Power Systems: Optimization of System Performance and Cost Through Control Strategies", International Journal of Hydrogen Energy, vol. 24, No. 12, Dec. 1999, pp. 1139-1156.

(Continued)

*Primary Examiner*—Adolf Berhane
*Assistant Examiner*—Yalkew Fantu
(74) *Attorney, Agent, or Firm*—Foley & Lardner LLP

(57) ABSTRACT

A power generation control system for a fuel cell, including a chargeable/dischargeable unit connected to a fuel cell, for being charged with electric power from the fuel cell and discharging electric power to a load, a target power computing unit for computing a target power to be generated by the fuel cell, a power-lowering request detection unit for detecting a power-lowering request to the fuel cell, an available power detection unit for detecting available power of the chargeable/dischargeable unit, a power extraction limiting unit for limiting electric power to be extracted from the fuel cell based on the power-lowering request detected by the power-lowering request detection unit and the available power detected by the available power detection unit, and a power extraction control unit for controlling electric power to be extracted from the fuel cell based on the target power and an output of the power extraction limiting unit.

10 Claims, 13 Drawing Sheets

U.S. PATENT DOCUMENTS

| | | | |
|---|---|---|---|
| 6,255,008 B1 * | 7/2001 | Iwase | 429/9 |
| 6,447,939 B1 * | 9/2002 | Iwasaki | 429/9 |
| 2004/0038092 A1 | 2/2004 | Scholta et al. | |

FOREIGN PATENT DOCUMENTS

| WO | WO 02/01657 A2 | 1/2002 |
|---|---|---|

OTHER PUBLICATIONS

C. Meurer et al., "Phoebus—An Autonomous Supply with Renewable Energy: Six Years of Operational Experience and Advanced Concepts", Solar Energy, vol. 67, No. 1-3, Jul. 1999, pp. 131-138.

H. Solmecke, "Comparison of Solar Hydrogen Storage Systems With and Without Power-electronic DC-DC Converters", Renewable Energy, vol. 19, No. 1-2, pp. 333-338.

* cited by examiner

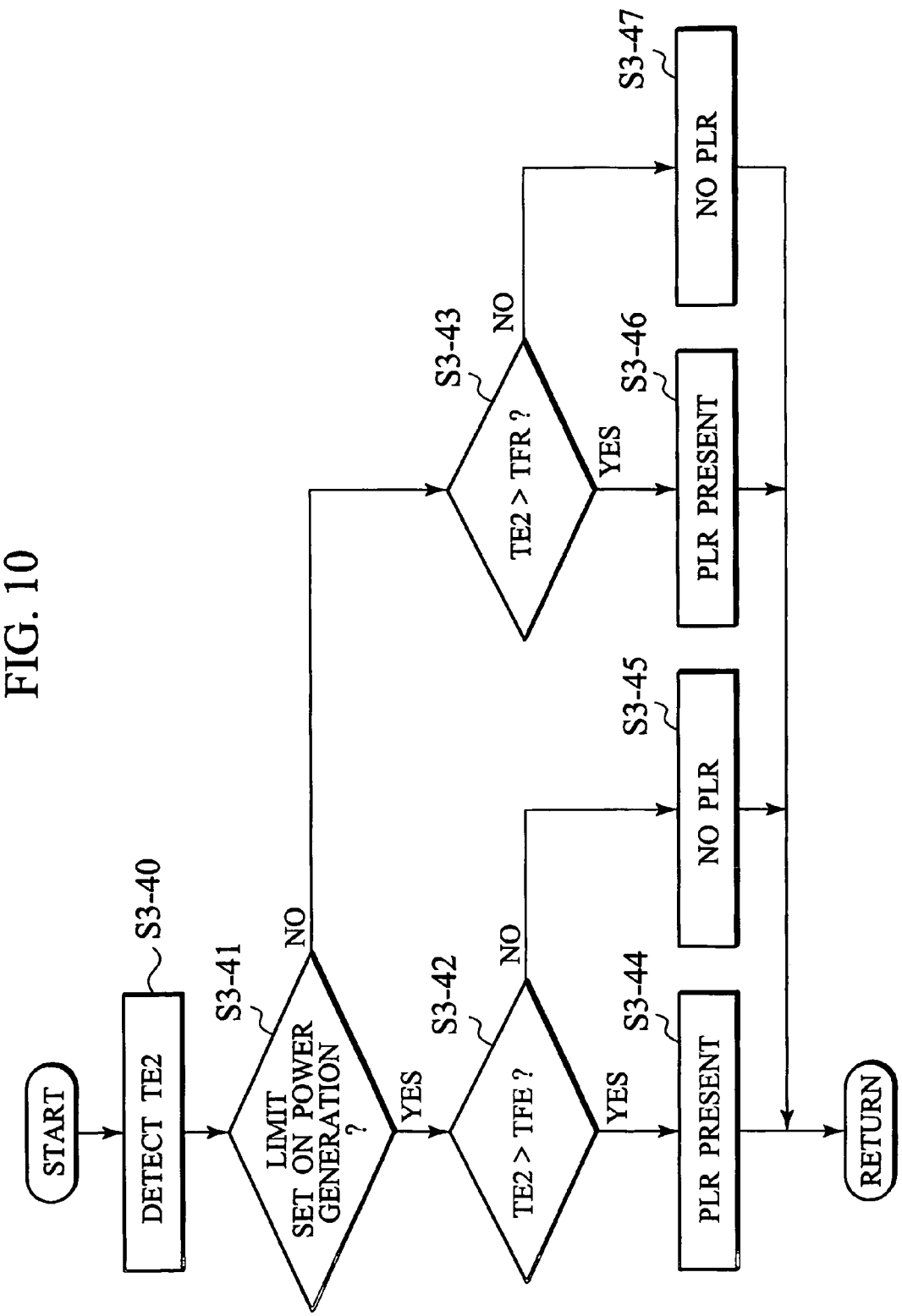

US 7,564,211 B2

ELECTRIC POWER GENERATION CONTROL SYSTEM AND ELECTRIC POWER GENERATION CONTROL METHOD FOR FUEL CELL

TECHNICAL FIELD

The present invention relates to an electric power generation control system for a fuel cell, for controlling electric power to be extracted from the fuel cell, and a related control method.

BACKGROUND ART

Fuel cells are electrochemical devices which convert the chemical energy of a chemical reaction directly into electrical energy. A typical fuel cell consists of an electrolyte membrane and anode and cathode compartments sandwiching the electrolyte membrane therebetween, in which fuel gas is fed continuously to the anode compartment, air is fed continuously to the cathode compartment, and oxygen from air and hydrogen contained in the fuel gas electrochemically reacts to generate electric power. If gas shortage occurs in a local region in the compartment, power output of the fuel cell drops, which may result in overcurrent causing cells to be damaged. It is required in control of a fuel cell to have a function to detect the presence of such deteriorated operating condition and recover the deteriorated operating condition, so as to preclude the cells from being damaged.

Japanese Patent Application Laid-Open Publication No. 6-243882 discloses a control method for a fuel cell stack compartmentalized into a plurality of cell sections, in which output voltages of the cell sections are monitored and when the lowest voltage in the detected drops below a predetermined value, the operation of the fuel cell stack is stopped for protecting the system regardless of the magnitude of load on the fuel cell.

DISCLOSURE OF INVENTION

In the control method set forth above, if the detected voltage of a certain cell section drops below the predetermined value, the operation of the fuel cell is forced to stop even in a situation with the operating condition thereof remaining in a slightly deteriorated degree. If operation of the fuel cell is stopped, a vehicle powered by the fuel cell can continue traveling only for a residual charge of a secondary battery.

The present invention was made in the light of this problem. An object of the present invention is to provide an electric power generation control system for a fuel cell, which controls power extraction from the fuel cell and maintain the drive power, without causing any further deterioration in the operating condition of the system.

An aspect of the present invention is a power generation control system for a fuel cell, comprising: a chargeable/dischargeable unit connected to a fuel cell, for being charged with electric power from the fuel cell and discharging electric power to a load; a target power computing unit for computing a target power to be generated by the fuel cell; a power-lowering request detection unit for detecting a power-lowering request to the fuel cell; an available power detection unit for detecting available power of the chargeable/dischargeable unit; a power extraction limiting unit for limiting electric power to be extracted from the fuel cell based on the power-lowering request detected by the power-lowering request detection unit and the available power detected by the available power detection unit; and a power extraction control unit for controlling electric power to be extracted from the fuel cell based on the target power computed by the target power computing unit and an output of the power extraction limiting unit, wherein, as the power-lowering request detection unit detects a power-lowering request, the power extraction limiting unit reduces electric power to be extracted from the fuel cell by an amount less than the available power of the chargeable/dischargeable unit.

BRIEF DESCRIPTION OF DRAWINGS

The invention will now be described with reference to the accompanying drawings wherein:

FIG. 10 is a flowchart illustrating a basic process flow for providing the power-lowering request during control of the electric power generation control system of the third embodiment.

BEST MODE FOR CARRYING OUT THE INVENTION

Figure 1:
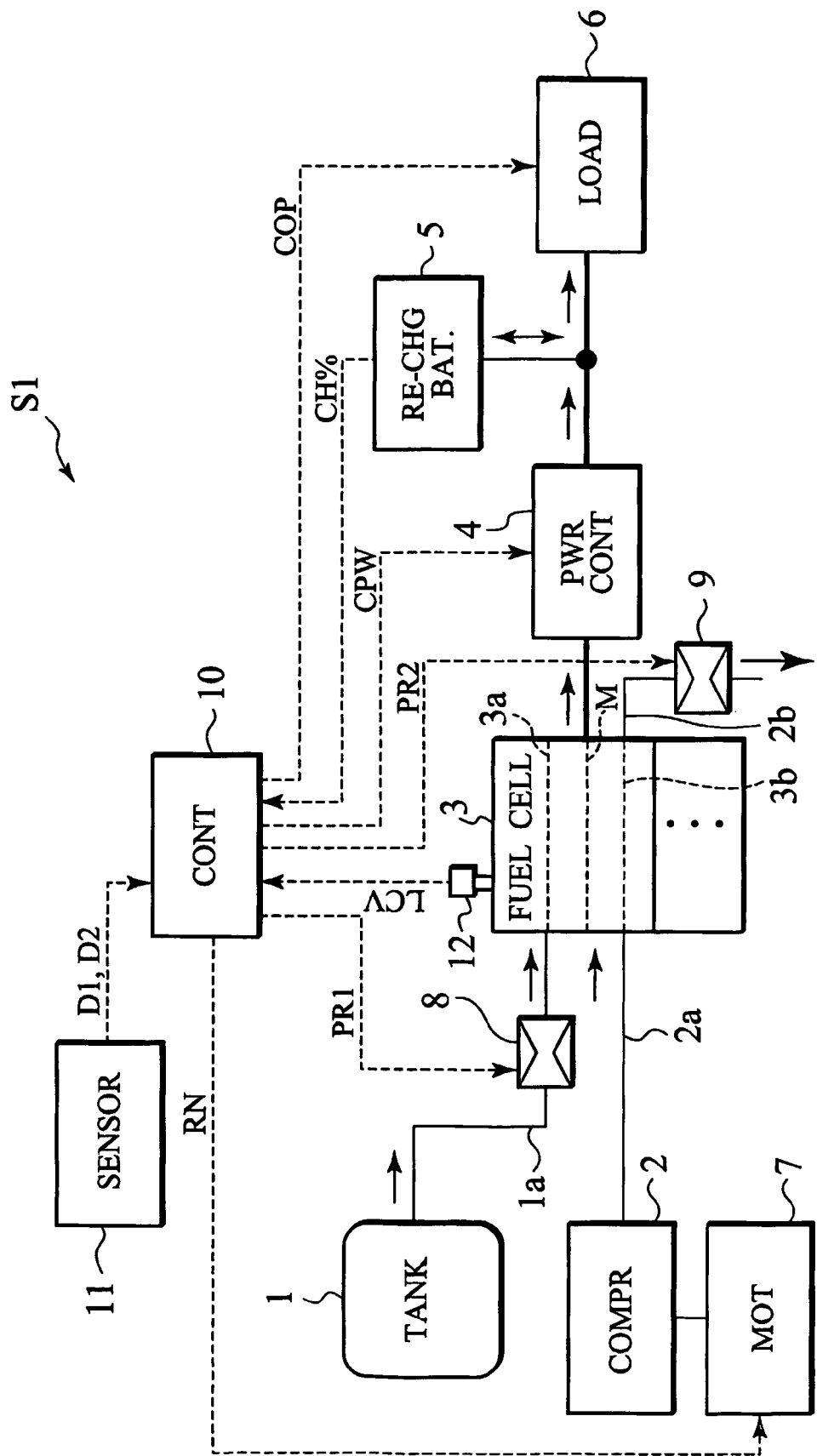
FIG. 1 is a block diagram of a fuel cell system involving an electric power generation control system for a fuel cell according to a first embodiment of the present invention.

Embodiments of the present invention will be explained below with reference to the drawings, wherein like members are designated by like reference characters.

An electric power generation control system for a fuel cell of the first embodiment is involved in a fuel cell system S1 in FIG. 1, which includes a fuel tank 1, a compressor 2, a fuel cell 3, a power controller 4, a rechargeable battery (power rechargeable unit or secondary battery) 5, a load (drive motor) 6, a motor 7, pressure control valves 8, 9, and a controller 10.

The fuel cell 3 consists of a hydrogen electrode 3a to be supplied with hydrogen gas as fuel gas, an air electrode 3b to be supplied with air as oxidant gas, a high polymer electrolyte membrane M sandwiched between the hydrogen electrode 3a and the air electrode 3b. Hydrogen ($H_2$) contained in the supplied hydrogen gas frees electrons at the hydrogen electrode 3a to form two protons ($H^+$). The protons diffuse through the electrolyte membrane M and at the air electrode 3b react with the electrons and oxygen ($O_2$) in the supplied air to form water ($H_2O$). This provides an electric current in an external circuit between the hydrogen electrode 3a and the air electrode 3b.

Hydrogen gas is fed from the fuel tank 1 to the hydrogen electrode 3a. The pressure control valve 8 is provided on a fuel supply line 1a between the fuel tank 1 and the fuel cell 3 to control the flow rate and pressure at which hydrogen gas is supplied to the fuel cell 3.

In the meanwhile, air is compressed with the compressor 2 driven by the motor 7 and supplied through an air supply line 2a to the air electrode 3b of the fuel cell 3. The flow rate and pressure at which air is supplied to the fuel cell 3 are adjusted by changing the number of revolutions of the motor 7 and a set pressure of the pressure control valve 9 provided on an air discharge line 2b from an outlet of the air electrode 3b of the fuel cell 3.

The power controller 4 serves to allow electric power to be extracted from the fuel cell 3 and to be supplied to the load 6 and the rechargeable battery 5.

The rechargeable battery 5 is connected between the fuel cell 3 and the load 6 in parallel thereto and operative to be charged when the load 6 consumes electric power at a lower rate than that supplied from the power controller 4 while discharging electric power when the load 6 consumes electric power at a higher rate than that supplied from the power controller 4.

The controller 10 computes target power TPW to be generated by the fuel cell 3, and adjusts set pressures PR1, PR2 of the pressure control valves 8, 9 and the revolution speed RN of the motor 7 so that electric power is generated at a predetermined rate, while delivering extraction power command CPW to the power controller 4. The controller 10 is also responsive to an accelerator displacement value D1 and a vehicle speed D2 detected by sensors 11 to calculate demanded load, and applies an operating command COP to the load 6 for controlling drive power of a vehicle.

Further, although the power controller 4 is connected between the fuel cell 3 and the load 6 in FIG. 1, the power controller 4 may be connected between the rechargeable battery 5 and the load 6 so as to control electric power to be supplied from the fuel cell 3.

Figure 2:
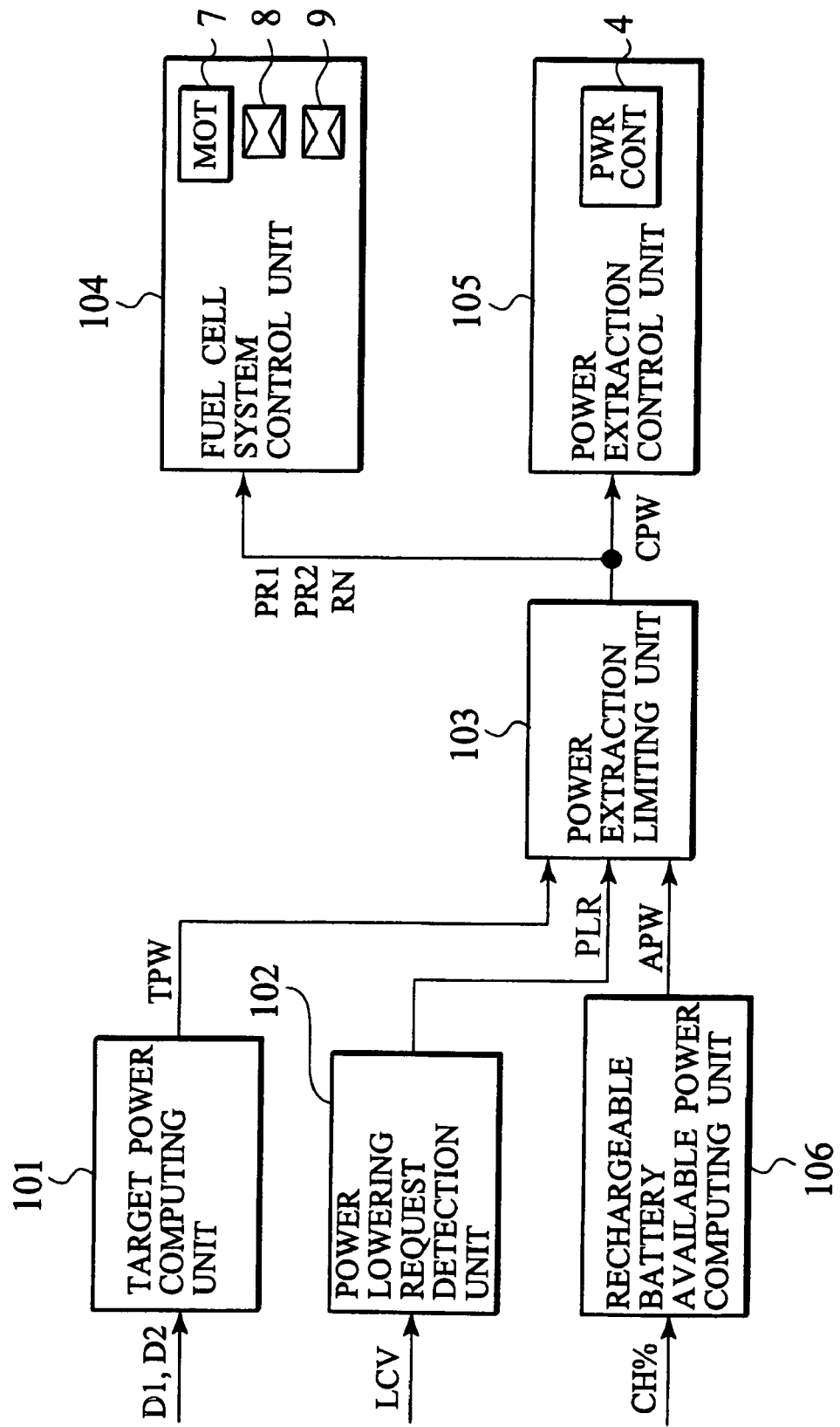
FIG. 2 is a control diagram of an electric power generation control system according to first to fourth embodiments of the present invention.

In FIG. 2, the electric power generation system includes a target power computing unit 101, a power-lowering request detection unit 102, a power extraction limiting unit 103, a fuel cell system control unit 104, a power extraction control unit 105, and a rechargeable-battery available-power computing unit 106.

The target power computing unit 101 computes target power TPW to be generated by the fuel cell 3. The power-lowering request detection unit 102 detects a power-lowering request PLR for electric power to be generated by the fuel cell 3. The rechargeable-battery available-power computing unit 106 computes available power APW to be outputted from the rechargeable battery 5. The power extraction limiting unit 103 provides commands for limiting electric power to be extracted from the fuel cell 3 from the target power TPW from the target power computing unit 101, the power-lowering request PLR from the power-lowering request detection unit 102 and the available power APW from the rechargeable-battery available-power computing unit 106. In response to the output from the power extraction limiting unit 103, the fuel cell system control unit 104 controls the fuel cell system S1, and the power extraction control unit 105 controls electric power to be extracted from the fuel cell 3.

Now, a basic process flow to be executed in the fuel cell system S1 of the first embodiment will be described with reference to a flowchart shown in FIG. 3. The routine of the processes from "START" to "END" in the flowchart are repeatedly executed every fixed time interval.

Figure 3:
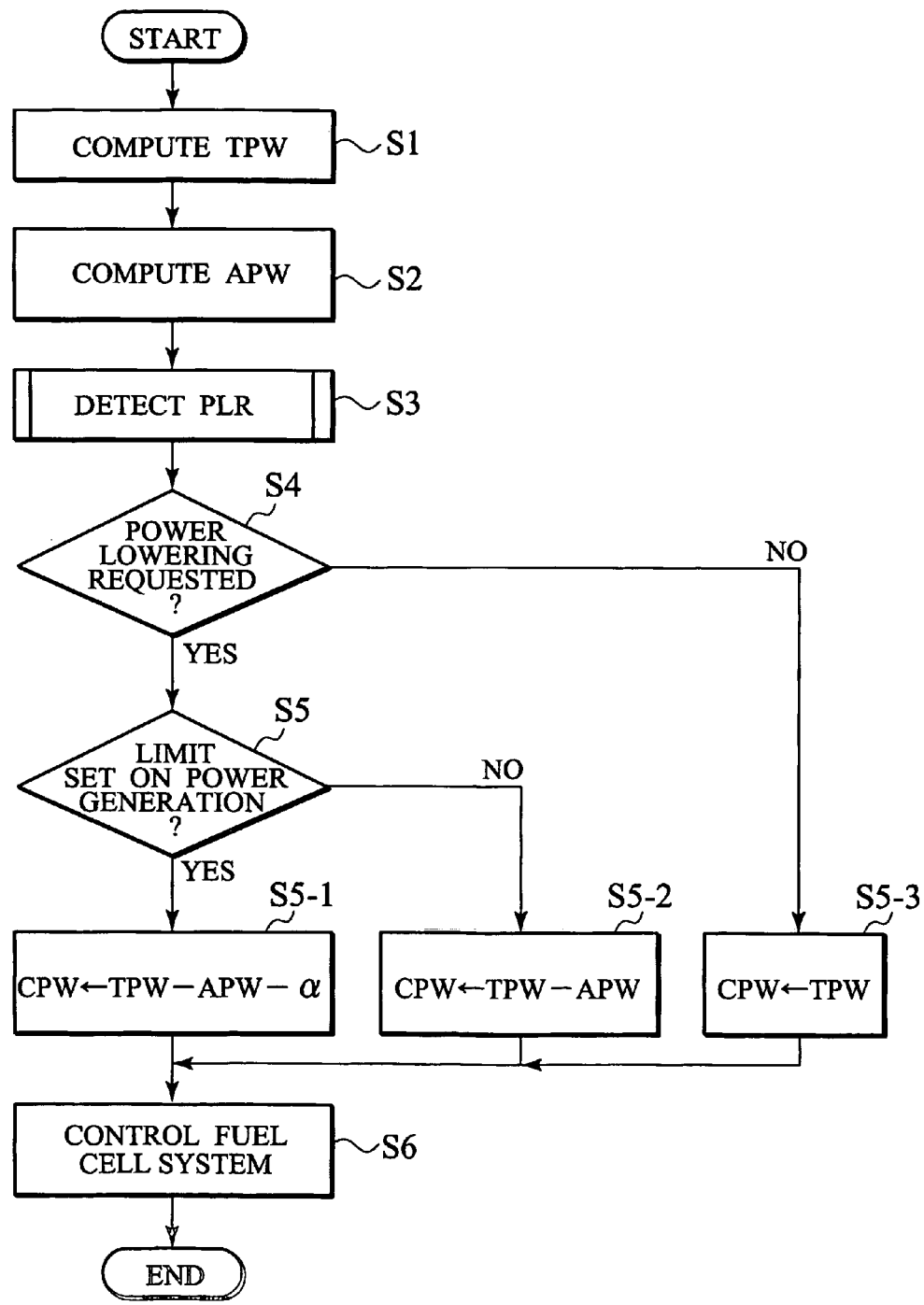
FIG. 3 is a control flowchart illustrating a basic process flow of an electric power generation control system of the first embodiment.

In step S1 in FIG. 3, the target power computing unit 101 computes target power TPW for power generation by the fuel cell 3 from the data such as the accelerator displacement value D1, the vehicle speed D2 and power demanded by the drive motor as the load 6.

Figure 4:
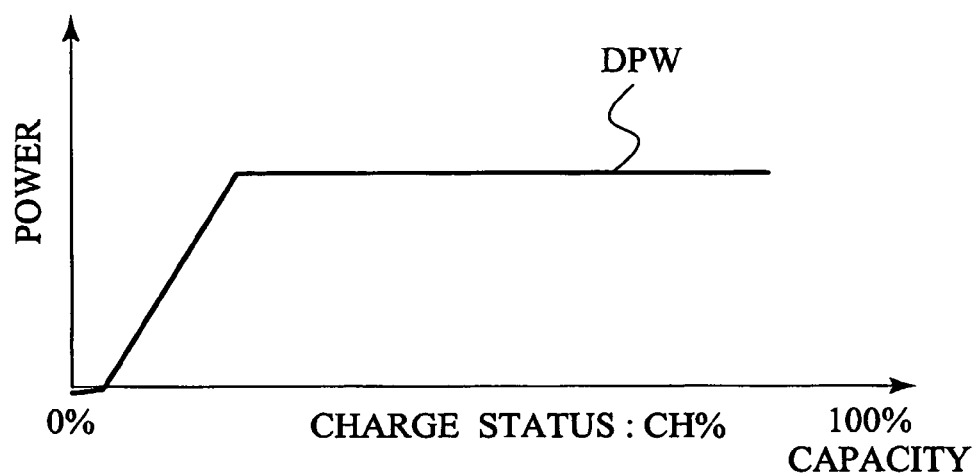
FIG. 4 is a graph showing the relationship between charge status of a rechargeable battery and dischargeable power thereof.

In step S2, the rechargeable-battery available-power computing unit 106 computes available power APW of the rechargeable battery 5. FIG. 4 shows an example of the relationship between a charge status CH % of the rechargeable battery 5 and dischargeable power DPW thereof. Available power APW is set to be equal to a residual power obtained by subtracting a currently discharging electric power from the dischargeable power DPW.

In step S3, the power-lowering request detection unit 102 detects the power-lowering request PLR to provide an output indicative of presence or absence of this request.

In step S4, determination is made to find whether the power-lowering request PLR is provided, in response to the output indicative of presence or absence of the power-lowering request PLR provided in the preceding step S3. If it is determined that no power-lowering request PLR is present, process proceeds to step S5-3 where the extraction power CPW is set to be equal to the target power TPW. If it is determined in step S4 that the power-lowering request PLR is present, process is routed to step S5 where determination is made to find whether a limit is set on electric power to be generated in the preceding routine.

If it is determined in step S5 that no limit is set on electric power to be generated, process proceeds to step S5-2 where the extraction power CPW is set to be equal to a value obtained by subtracting the available power APW computed in step S2 from the target power TPW.

If it is determined in step S5 that a limit is set on electric power to be generated, that means the power-lowering request PLR is still present to further lower the extraction power CPW which has been limited in the preceding routine by subtracting the available power APW of the rechargeable battery 5 therefrom, the extraction power CPW is set to be a value obtained by subtracting the available power APW computed in step S2 and a value α of predetermined amount from the target power TPW.

In step S6, various actuators such as the pressure control valves 8, 9 and the motor 7 of the fuel cell system S1 are controlled in dependence upon the extraction power command CPW computed in one of these steps S5-1, S5-2 and S5-3.

In the first embodiment, the power-lowering request detection unit 102 is provided with a voltage sensor 12 (cell voltage detection unit), as shown in FIG. 1, to detect the lowest voltage (the lowest cell voltage LCV) among cell voltages CVs of various unit cells or a plurality of unit cell groups in the fuel cell 3, and is operative to determine the presence of the power-lowering request PLR based on the detected lowest cell voltage LCV.

Next, detailed description will be made on processes for detecting the power-lowering request PLR in step S3 following steps S1, S2 in the flowchart shown in FIG. 3 with reference to a flowchart of FIG. 5.

Figure 5:
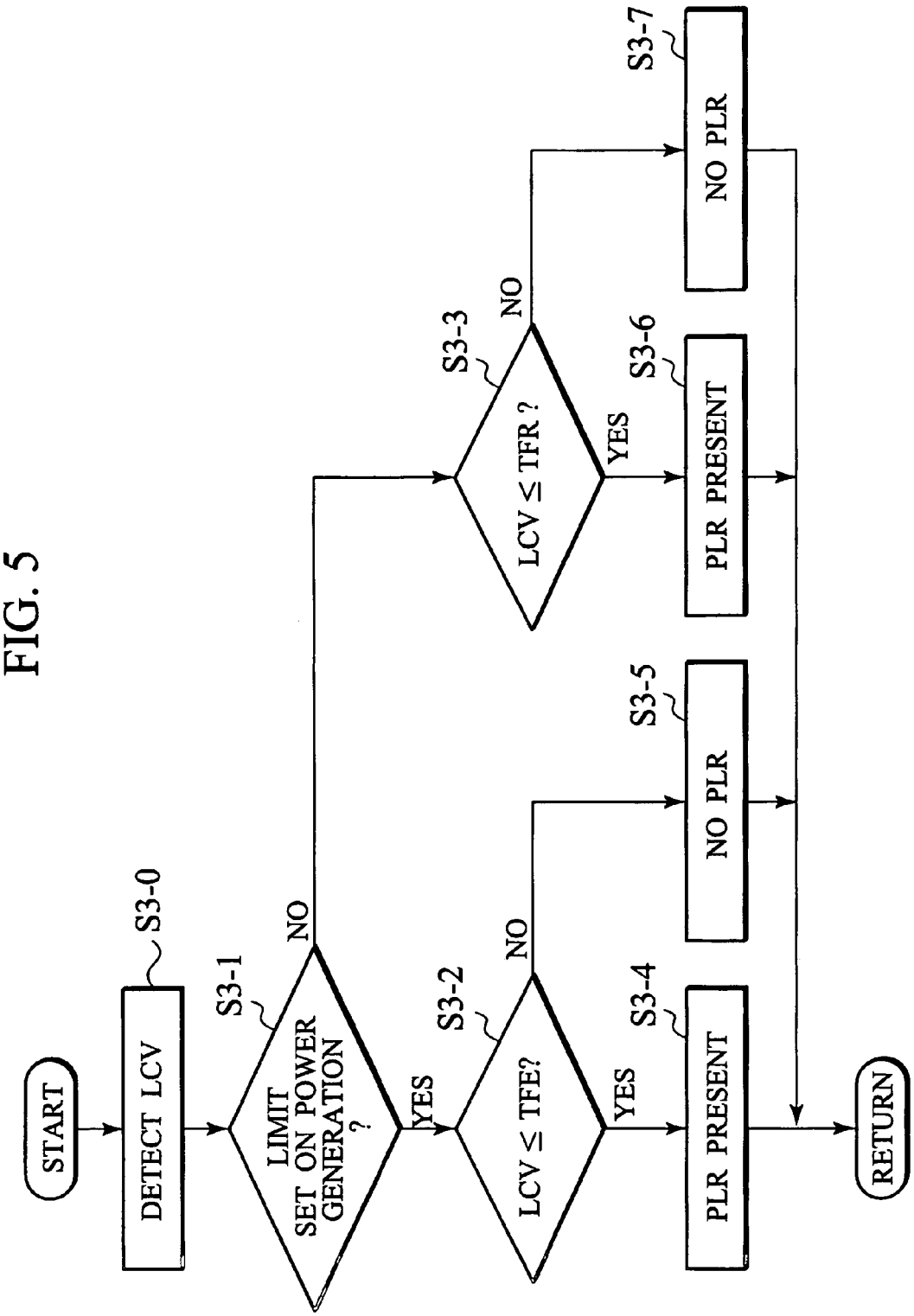
FIG. 5 is a flowchart illustrating a basic process flow for providing a power-lowering request during control of the electric power generation control system of the first embodiment.

In step S3-0 in FIG. 5, the lowest cell voltage LCV of the unit cells forming the fuel cell is detected.

In step S3-1, determination is made to find whether the limit is set on electric power to be generated during preceding computing step. If it is determined that no limit is set on electric power to be generated, process is routed to step S3-3 where determination is made to find whether the lowest cell voltage LCV is less than a threshold for requesting to lower power extraction TFR. If it is determined that the lowest cell voltage LCV is less than the threshold for requesting to lower power extraction TFR, process is routed to step S3-6 where the controller sets that the power-lowering request is present.

On the contrary, if it is determined that the lowest cell voltage LCV is greater than the threshold for requesting to lower power extraction TFR, process is routed to step S3-7 where the controller sets that the power-lowering request is not present. Further, if it is determined in step S3-1 that the limit is set on electric power to be generated during preceding computing step, process is routed to S3-2 where determination is made to find whether the lowest cell voltage LCV is less than a threshold for ending request to lower power extraction TFE. If it is determined that the lowest cell voltage LCV is less than the threshold for ending the request to lower power extraction TFE, process is routed to step S3-4 where it is determined that no cell voltage CV is still recovered with a need for further limiting electric power to be extracted, and the controller sets that the power-lowering request is present.

On the contrary, if it is determined that the lowest cell voltage LCV is greater than the threshold for ending request to lower power extraction TFE, process is routed to step S3-5 where it is determined that the cell voltage CV is already recovered with no need for limiting power extraction, and the controller sets that no power-lowering request is present. Subsequently, processes in steps S4 to S6 shown in FIG. 3 are executed.

Figure 6A:
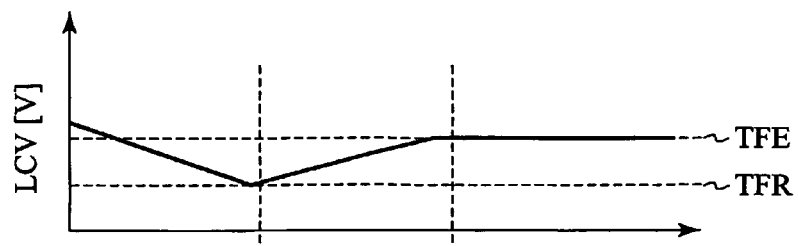
FIGS. 6A to 6E are timing charts illustrating operation of the electric power generation system of the first embodiment.
Figure 6B:
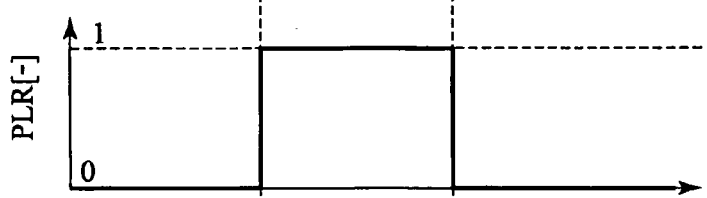
Figure 6C:
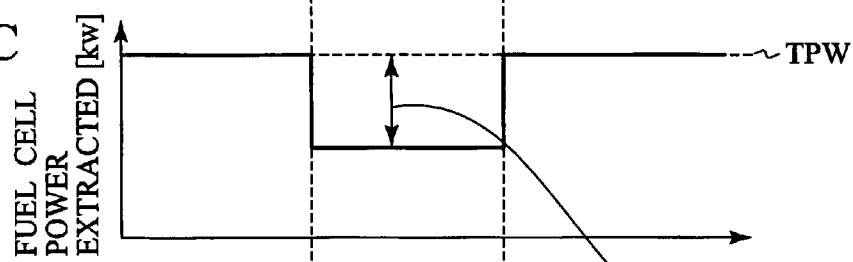
Figure 6D:
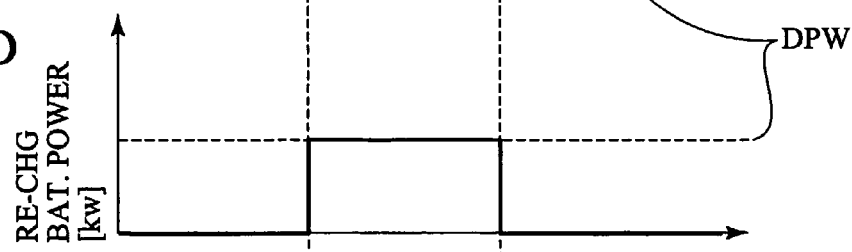
Figure 6E:
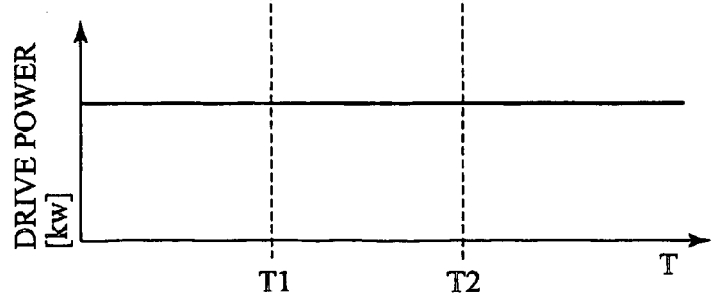

FIGS. 6A to 6E illustrate operations to be executed in the first embodiment. FIG. 6A shows variation in the lowest cell voltage LCV in terms of time. In FIG. 6A, an upper broken line designates the threshold for ending request to lower power extraction TFE, and a lower broken line designates the threshold for requesting to lower power extraction TFR. FIG. 6B shows the presence of or the absence of the power-lowering request in terms of time. In FIG. 6B, a value "1" represents the presence of the power-lowering request, and a value "0" represents the absence of the power-lowering request. FIG. 6C shows variation in fuel-cell extraction power CPW in terms of time. In FIG. 6C, a solid polygonal line represents extraction power CPW to be extracted from the fuel cell, and a broken line represents target power TPW. FIG. 6D shows variation in rechargeable battery power in terms of time. In FIG. 6D, a solid polygonal line represents actually discharged power, and a broken line represents dischargeable electric power DPW to be discharged from the rechargeable battery. FIG. 6E shows variation in drive power in terms of time. FIGS. 6A to 6E totally show the relationship among cell voltage, the presence of or the absence of the power-lowering request, fuel cell extraction power, rechargeable battery power and drive power.

As shown in FIGS. 6A, 6B, when the lowest cell voltage LCV falls with the elapse of time and reaches the threshold for requesting to lower power extraction TFR at time T1, the power-lowering request is provided. And as shown in FIGS. 6C, 6D, extraction power CPW is limited and the rechargeable battery compensates electric power by the amount of decrement equivalent to resulting extraction power CPW. This decreases the load of the fuel cell, thereby permitting the lowest cell voltage LCV to be gradually restored. Then, as shown in FIGS. 6A, 6B, if the lowest cell voltage LCV reaches the threshold for ending request to lower power extraction TFE at time T2, the power-lowering request is cancelled. At the same time, as shown in FIGS. 6C, 6D, the limit on fuel-cell extraction power CPW is cancelled, thereby terminating electric power compensation from the rechargeable battery. During this period, no adverse affect occurs in drive power to be delivered to a vehicle as shown in FIG. 6E.

As will be appreciated from FIGS. 6A to 6E, the power-lowering request is derived depending upon the value of the lowest cell voltage LCV whereupon decreasing fuel-cell extraction power CPW by the value equivalent to available power APW (which equals to dischargeable power DPW in FIG. 6D) of the rechargeable battery enables the lowest cell voltage LCV to be limited from continuous drop, caused by deterioration in an operating condition of the fuel cell due to localized gas shortage, without causing any adverse affect on the drive power.

As set forth above, the first embodiment contemplates the provision of the power-lowering request detection unit 102 that detects the presence of the power-lowering request regardless of the load demand that is computed based on the accelerator displacement value D1 and the vehicle speed D2. Thus, when power-lowering request detection unit 102 detects the presence of the power-lowering request related to the fuel cell 3, due to the presence of the limited amount of extraction power CPW resulting from the fuel cell 3, to be limited, remains in a range within dischargeable electric power DPW of the rechargeable battery 5, extraction power CPW can be successfully controlled without inviting deterioration in the operating condition of the fuel cell system S1 while suppressing adverse affect on the drive power. That is, decreasing extraction power CPW from the fuel cell by the amount equivalent to available power APW of the rechargeable battery 5 enables to satisfy the power-lowering request while suppressing adverse affect on the drive power.

Further, by providing the power-lowering request in the presence of drop in the lowest cell voltage LCV, a further drop in the lowest cell voltage LCV, resulting from deteriorated operating conditions of the fuel cell 3 due to the occurrence of localized gas shortage, can be suppressed.

Furthermore, due to a capability of detecting the recovery of the lowest cell voltage LCV and canceling the power-lowering request for thereby permitting extraction power CPW of the fuel cell 3 to be restored to its original state, the fuel cell system S1 can be rapidly restored to a normal electric power generation mode, minimizing the load to the secondary battery.

Next, a second embodiment of the present invention is described with reference to a fuel cell system S2 for a vehicle involving an electric power generation control system for a fuel cell shown in FIG. 7.

Figure 7:
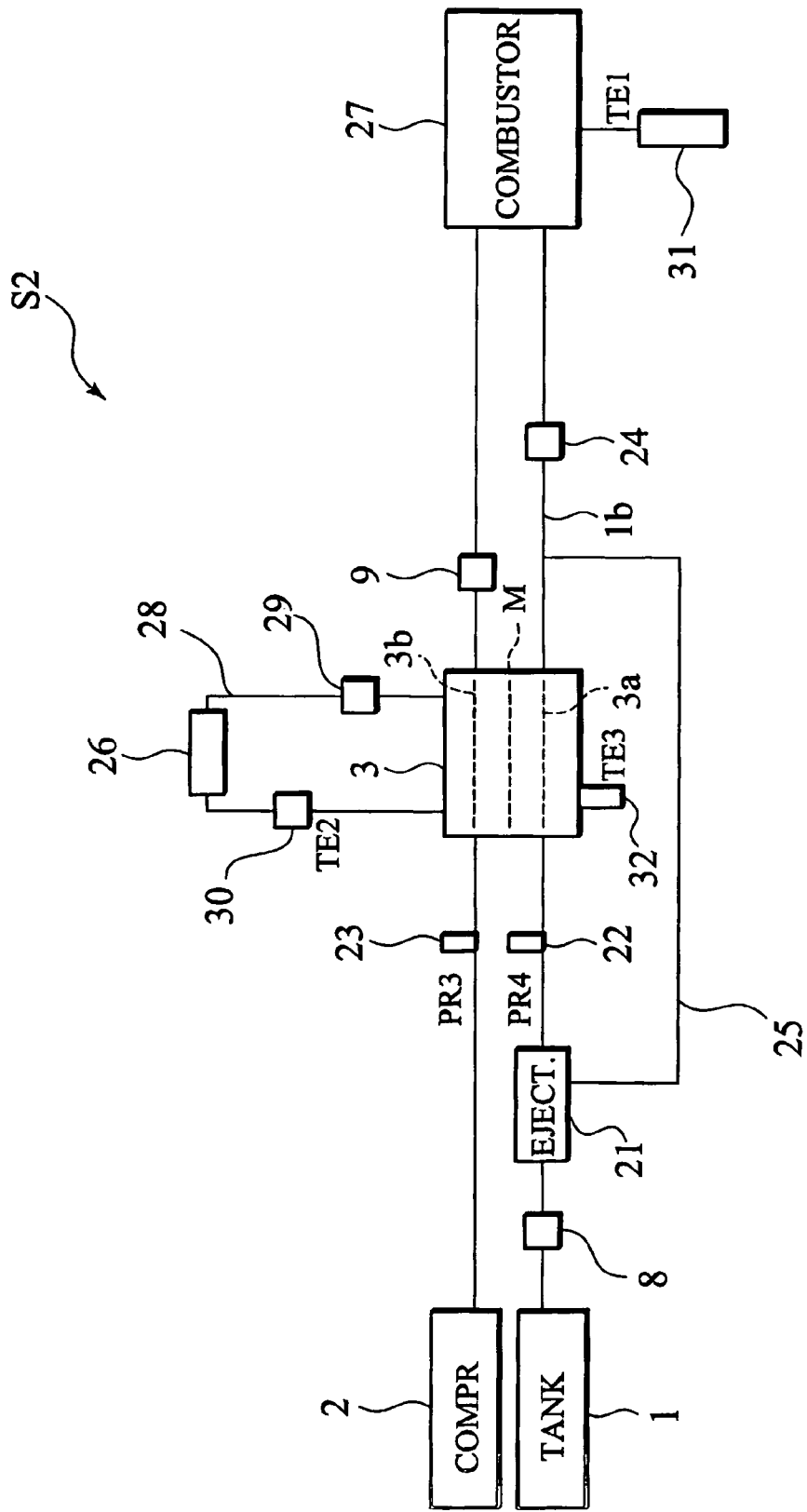
FIG. 7 is a block diagram of a fuel cell system involving an electric power generation control system for a fuel cell according to second to fourth embodiments of the present invention.

In the second-embodiment shown in FIG. 7, a gas delivery system includes an ejector 21, pressure sensors 21, 23, a purge valve 24, a hydrogen recirculation line 25, a heat exchanger 26, a combustor 27, a coolant passage 28, a pump 29 and temperature sensors 30, 31. In FIG. 7, the same component parts as those of FIG. 1 bearing the same reference numerals have the same functions.

The pressure control valve 9 controls the pressure at the air electrode 3b of the fuel cell 3 to a value depending upon the load in response to a pressure value PR3 detected by the pressure sensor 23 positioned at the inlet of the air electrode 3b of the fuel cell 3. The pressure control valve 8 controls the pressure at the hydrogen electrode 3a of the fuel cell 3 to a value depending upon the load in response to a pressure value PR4 detected by the pressure sensor 22 positioned at the inlet of the hydrogen electrode 3a of the fuel cell 3. The purge valve 24 is located in an exhaust line 1b extending from the hydrogen electrode 3a of the fuel cell 3 and normally kept closed. Upon detection of a drop in the cell voltage CV caused by water jamming in the fuel cell 3, the purge valve 24 is opened to expel moisture content with hydrogen gas from the line to the outside.

Located downstream of the pressure control valve 9 and the purge valve 24 is the combustor 27 in which exhaust air and purged exhaust hydrogen gases join and are combusted. The temperature sensor 31 is mounted to the combustor 27 to detect the temperature TE1 of combustion gas. Also, the hydrogen recirculation line 25 has one end coupled to the upstream of the purge valve 24. The other end of the line 25 is coupled to a fuel supply line 1a downstream of the pressure control valve 8 via the ejector 21. This allows a charge of hydrogen, that has not been fully consumed, to be fed to the hydrogen electrode 3a of the fuel cell 3 again for the purpose of maintaining a stoichiometric ratio (indicative of supply flow rate/consumption flow rate) at a value greater than "1" to stabilize the cell voltage CV.

The coolant passage 28 serves as a passageway through which coolant flows to cool the body of the fuel cell 3. Provided on the coolant passage 28 are the heat exchanger 26 and the pump 29 to flow coolant. The temperature sensor 30 detects a coolant temperature TE2 of the fuel cell 3.

In the second embodiment, the power-lowering request detection unit serves to detect the temperature TE1 of the combustor 27 shown in FIG. 7 and makes determination, in response to the detected temperature TE1, to find whether the power-lowering request is present. The basic process flow in control of the second embodiment is identical to that of the flowchart shown in FIG. 3 except for step S3 related to process for the power-lowering request. Process for the power-lowering request is described below with reference to a flowchart shown in FIG. 8.

Figure 8:
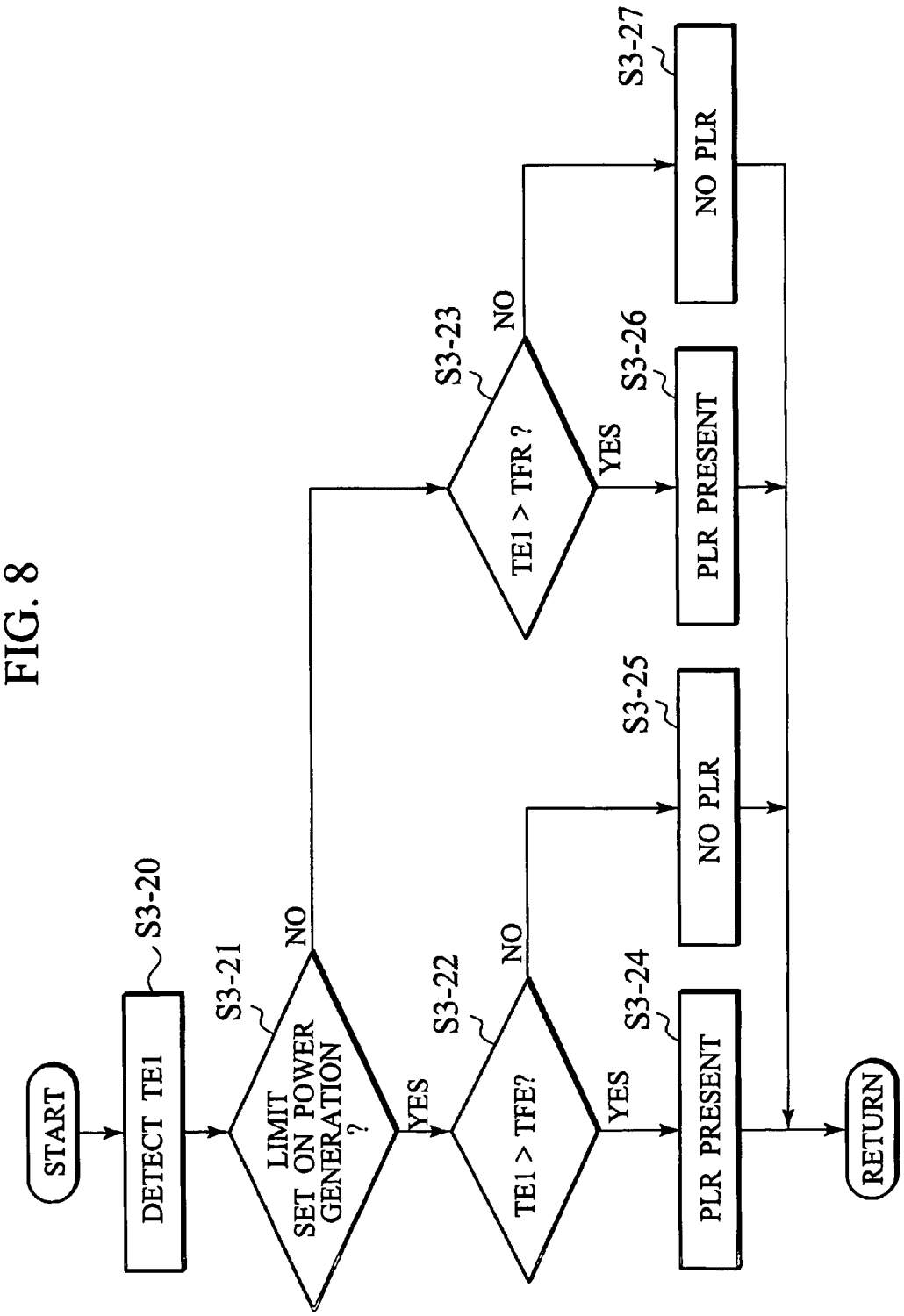
FIG. 8 is a flowchart illustrating a basic process flow for providing the power-lowering request during control of the electric power generation control system of the second embodiment.

In step S3-20 in FIG. 8, the temperature sensor 31 detects the temperature TE1 of the combustor 27.

In step 3-21, determination is made to find whether the limit is set on electric power to be generated during preceding computing step. If it is determined that no limit is set on electric power to be generated, process is routed to step S3-23 where determination is made to find whether the temperature TE1 of the combustor 27 is greater than the threshold for requesting to lower power extraction TFR. If it is determined that the temperature TE1 of the combustor 27 is greater than the threshold for requesting to lower power extraction TFR, process is routed to step 3-26 where the controller sets that the power-lowering request is present.

In contrast, if it is determined that the temperature TE1 of the combustor 27 is less than the threshold for requesting to lower power extraction TFR, process is routed to step 3-27 where the controller sets that the power-lowering request is absent. If it is determined in step S3-2 1 that the limit is set on electric power to be generated during preceding computing step, process is routed to step S3-22 where determination is made to find whether the temperature TE1 of the combustor 27 is greater than the threshold for ending request to lower power extraction TFE. If it is determined that the temperature TE1 of the combustor 27 is greater than the threshold for ending request to lower power extraction TEE, process is routed to step S3-24 where it is determined that the temperature TE1 of the combustor 27 is not adequately lowered yet and there is a need for further limiting electric power to be extracted whereupon the controller sets that the power-lowering request is present.

In the meanwhile, if it is determined that the temperature TE1 of the combustor 27 is less than the threshold for ending request to lower power extraction TFE, process is routed to step 3-25 where it is determined that the temperature TE1 of the combustor 27 is adequately lowered and there is no need for further limiting electric power to be extracted whereupon the controller sets that the power-lowering request is absent. Thereafter, processes in step S4 to S6 sown in FIG. 3 are repeatedly executed in the same manner as those of the first embodiment.

Figure 9A:
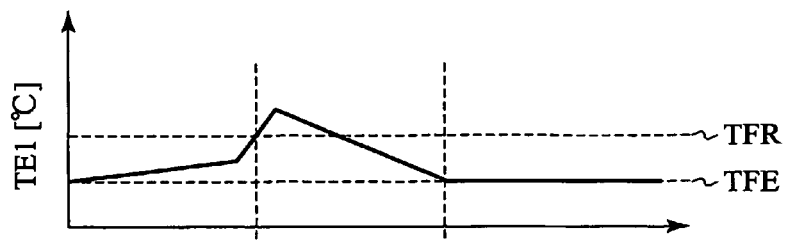
FIGS. 9A to 9E are timing charts illustrating operation of the electric power generation system of the second embodiment.
Figure 9B:
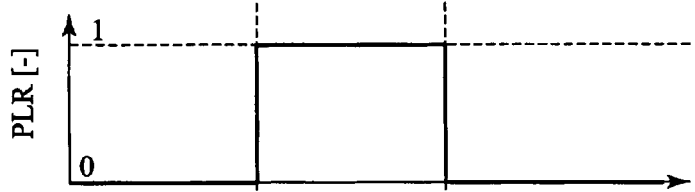
Figure 9C:
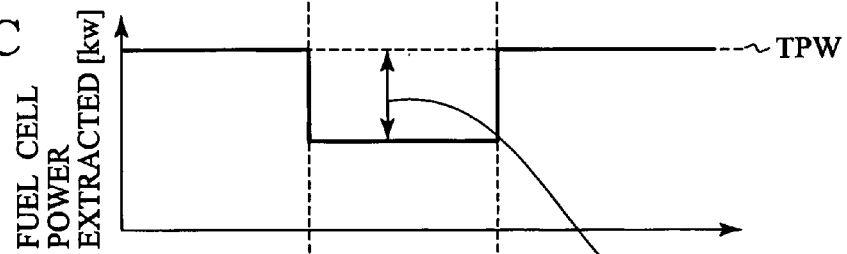
Figure 9D:
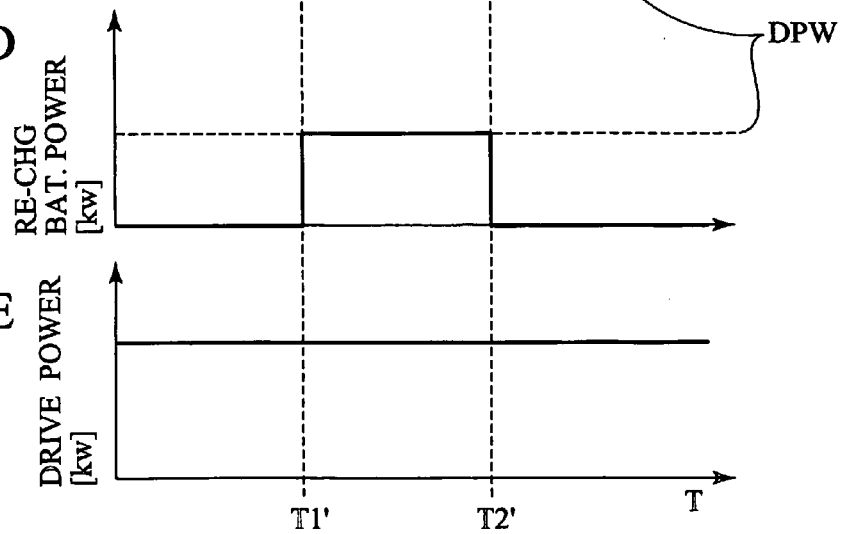
Figure 9E:
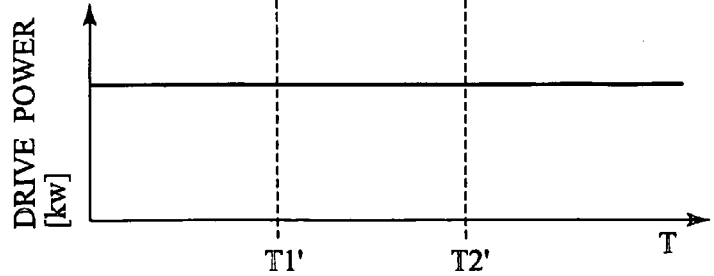

FIGS. 9A to 9E illustrate operations to be executed in the second embodiment. FIG. 9A shows variation in the temperature TE1 of the combustor 27 in terms of time. In FIG. 9A, a lower broken line designates the threshold for ending request to lower power extraction TFE, and an upper broken line designates the threshold for requesting to lower power extraction TFR. FIG. 9B shows the presence of or the absence of the power-lowering request in terms of time. In FIG. 9B, a value "1" represents the presence of power-lowering request, and a value "0" represents the absence of the power-lowering request. FIG. 9C shows variation in fuel-cell extraction power CPW in terms of time. In FIG. 9C, a solid polygonal line represents extraction power CPW to be extracted from the fuel cell, and a broken line represents target power TPW. FIG. 9D shows variation in rechargeable battery power DPW in terms of time. In FIG. 9D, a solid polygonal line represents actually discharged power, and a broken line represents dischargeable electric power DPW of the rechargeable battery. FIG. 9E shows variation in drive power in terms of time. FIGS. 9A to 9E totally show the relationship among the temperature of the combustor 27, the presence of or the absence of the power-lowering request, fuel cell extraction power, rechargeable battery power and drive power.

As shown in FIGS. 9A, 9B, when the temperature TE1 of the combustor 27 increases with the elapse of time and reaches the threshold for requesting to lower power extraction TFR at time T1', power-lowering request is executed. And as shown in FIGS. 9C, 9D, extraction power CPW is limited and the rechargeable battery compensates electric power by the amount of decrement equivalent to the resulting power CPW. This decreases the load of the fuel cell, and the temperature TE1 of the combustor 27 that has been increasing due to temporary shortage of oxygen is gradually lowered. Then, as shown in FIGS. 9A, 9B, if the temperature TE1 of the combustor 27 drops to threshold for ending request to lower power extraction TFE at time T2', power-lowering request is cancelled. At the same time, as shown in FIGS. 9C, 9D, the limit on fuel-cell extraction power CPW is cancelled, thereby terminating electric power compensation from the rechargeable battery. During this period, no adverse affect occurs in drive power to be delivered to a vehicle as shown in FIG. 9E.

As will be appreciated from FIGS. 9A to 9E, extraction-power-lowering request is derived depending upon the temperature TE1 of the combustor 27 whereupon decreasing fuel-cell extraction power CPW by the value equivalent to available power APW of the rechargeable battery enables suppression of temperature rise in the combustor 27 due to temporary shortage of oxygen in air to be fed to the combustor 27 because of the occurrence of control error or delay in response in the number of revolutions of a compressor drive motor, without causing any adverse affect on the drive power.

As set forth above, the second embodiment contemplates to generate extraction-power-lowering request in the presence of an increase in the temperature TE1 of the combustor 27 for exhaust hydrogen gas, thereby suppressing the occurrence of excessively high temperature rise in the combustor 27 for exhaust hydrogen gas without sacrificing drive power.

Further, due to a capability of detecting the temperature drop in the combustor 27 for exhaust hydrogen gas and canceling extraction-power-lowering request to allow extraction power of the fuel cell 3 to be recovered to its original state, excessively high temperature rise of the combustor 27 for exhaust hydrogen gas can be suppressed without sacrificing a quality of drive power and the fuel cell system S1 can be rapidly recovered to a normal electric power generation mode.

Next, a third embodiment of the present invention is described.

The third embodiment has a feature in that the power-lowering request detection unit permits the temperature sensor 30 shown in FIG. 7 to detect the temperature TE2 of coolant for cooling the fuel cell 3 to execute determination for extraction-power-lowering request based on the detected temperature TE2.

A basic sequence of control processes of the third embodiment is identical to those of the flowchart shown in FIG. 3 except for process to provide power-lowering request in step S3. Process for providing power-lowering request is described with reference to a flowchart shown in FIG. 10.

In step S3-40 in FIG. 10, the temperature sensor 30 detects the temperature TE2 of coolant for cooling the fuel cell 3.

In step S3-41, determination is made to find whether the limit is set on electric power to be generated during preceding computing step. If it is determined that no limit is set on electric power to be generated, process is routed to step S3-43 where determination is made to find whether the coolant temperature TE2 of the fuel cell 3 is greater than the threshold for requesting to lower power extraction TFR. If it is determined that the coolant temperature TE2 of the fuel cell 3 is greater than the threshold for requesting to lower power extraction TFR, process is routed to step S3-46 where the controller sets that the power-lowering request is present. On the contrary, if it is determined that the coolant temperature TE2 of the fuel cell 3 is less than the threshold for requesting to lower power extraction TFR, process is routed to step S3-47 where the controller sets that the power-lowering request is absent.

In step S3-41, if it is determined that the limit is set on electric power to be generated during preceding computing step, process is routed to step S3-42 where determination is made to find whether the coolant temperature TE2 of the fuel cell 3 is greater than threshold for ending request to lower power extraction TEE. If it is determined that the coolant temperature TE2 of the fuel cell 3 is greater than threshold for ending request to lower power extraction TFE, process is routed to step S3-44 where it is determined that the coolant temperature TE2 of the fuel cell 3 is not adequately lowered and there is a need for further limiting electric power to be extracted whereupon the controller sets that the power-lowering request is present.

If it is determined that the coolant temperature TE2 of the fuel cell 3 is less than the threshold for ending request to lower power extraction TFE, operation is routed to step S3-45 where it is determined that the coolant temperature TE2 of the fuel cell 3 is adequately lowered and there is no need for further limiting electric power to be extracted whereupon the controller sets that the power-lowering request is absent. Thereafter, processes in steps S4 to S6 shown in FIG. 3 are repeatedly executed in the same manner as those of the first embodiment.

Figure 11A:
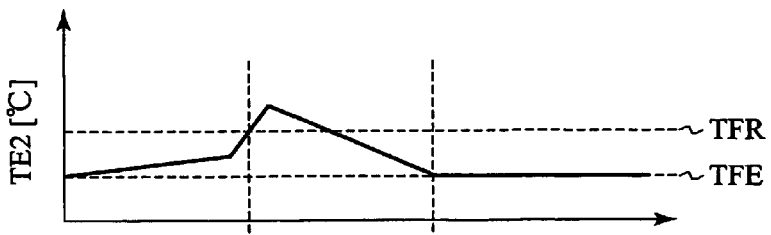
FIGS. 11A to 11E are timing charts illustrating operation of the electric power generation system of the third embodiment.
Figure 11B:
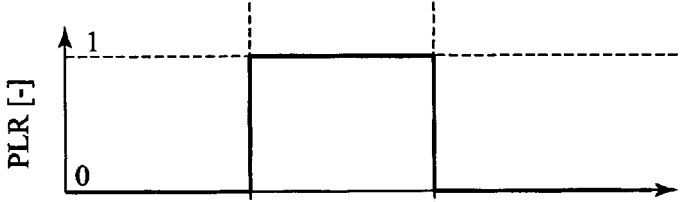
Figure 11C:
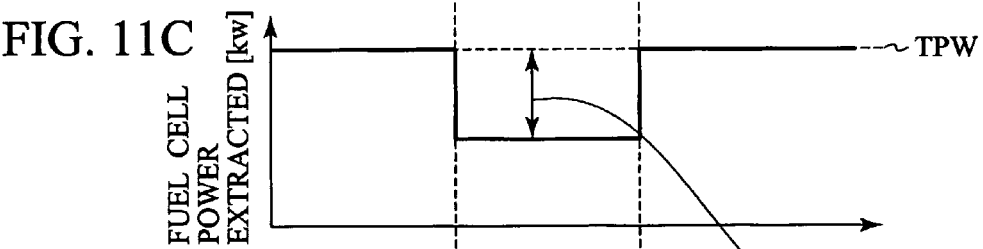
Figure 11D:
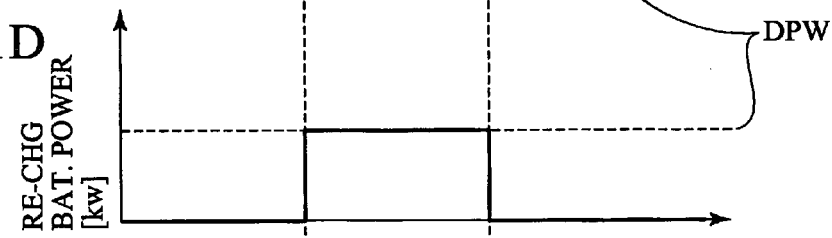
Figure 11E:
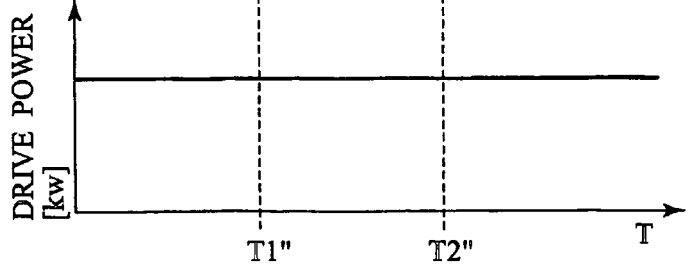

FIGS. 11A to 11E illustrate operations to be executed in the third embodiment. FIG. 11A shows variation in the coolant temperature TE2 of the fuel cell 3 in terms of time. In FIG. 11A, a lower broken line designates the threshold for ending request to lower power extraction TFE, and an upper broken line designates the threshold for requesting to lower power extraction TFR. FIG. 11B shows the presence of or the absence of the power-lowering request in terms of time. In FIG. 11B, a value "1" represents the presence of power-lowering request, and a value "0" represents the absence of the power-lowering request. FIG. 11C shows variation in fuel-cell extraction power CPW in terms of time. In FIG. 11C, a solid polygonal line represents extraction power CPW to be extracted from the fuel cell, and a broken line represents target power TPW. FIG. 11D shows variation in rechargeable battery power in terms of time. In FIG. 11D, a solid polygonal line represents actually discharged electric power, and a broken line represents dischargeable electric power DPW of the rechargeable battery. FIG. 11E shows variation in drive power in terms of time. FIGS. 11A to 11E totally show the relationship among the coolant temperature TE2 of the fuel cell 3, the presence of or the absence of the power-lowering request, fuel cell extraction power, rechargeable battery power and drive power.

As shown in FIGS. 11A, 11B, when the coolant temperature TE2 of the fuel cell 3 increases with the elapse of time and reaches the threshold for requesting to lower power extraction TFR at time T1", the power-lowering request is executed. And as shown in FIGS. 11C, 11D, extraction power CPW is limited and the rechargeable battery compensates electric power by the amount of decrement equivalent to the resulting extraction power CPW. This decreases the load of the fuel cell, and the cooling temperature TE2 of the fuel cell 3 gradually decreases. Then, as shown in FIGS. 11A, 11B, if the coolant temperature TE2 of the fuel cell 3 drops to the threshold for ending request to lower power extraction TFE at time T2", the power-lowering request is cancelled. At the same time, as shown in FIGS. 11C, 11D, the limit on fuel-cell extraction power CPW is cancelled, thereby terminating power compensation to be made by the rechargeable battery. During this period, no adverse affect occurs in drive power of the vehicle as shown in FIG. 11E.

As set forth above, the third embodiment contemplates to allow the extraction-power-lowering request to be provided based on an increase in the coolant temperature TE2 that has correlation with the cell temperature of the fuel cell 3 so as to decrease extraction power CPW of the fuel cell 3 by an amount equal to available power APW of the rechargeable battery 5. This suppresses the fuel cell 3 from excessively high temperature rise and deterioration in the fuel cell 3 can be avoided without causing adverse affect on drive power. Also, the power-lowering request detection unit may be provided with the temperature sensor 32 for directly measuring the cell temperature TE3 of cells forming the fuel cell 3 to allow determination whether to provide the power-lowering request based on the resulting output.

Further, by detecting the temperature drop in the fuel cell 3 and canceling the extraction-power-lowering request so as to allow extraction power of the fuel cell 3 to be recovered to an initial status, excessively high temperature rise of the fuel cell 3 can be avoided, and the fuel cell can be rapidly recovered to an initial normal electric power generation mode while suppressing an adverse affect on drive power, enabling reduction in load of the rechargeable battery at a minimal.

Next, a fourth embodiment of the present invention is described.

The fourth embodiment has a feature in that the power extraction limiting unit is so arranged as to continuously vary power extraction (in a ramp form) between target power TPW and available power APW of the rechargeable battery. Other features of the fourth embodiment are similar to those of the first to third embodiments and the fourth embodiment has the same structure as those shown in FIGS. 1, 3 and 7.

Next, a basic process flow of the fourth embodiment is described below with reference to a flowchart of FIG. 12.

Figure 12:
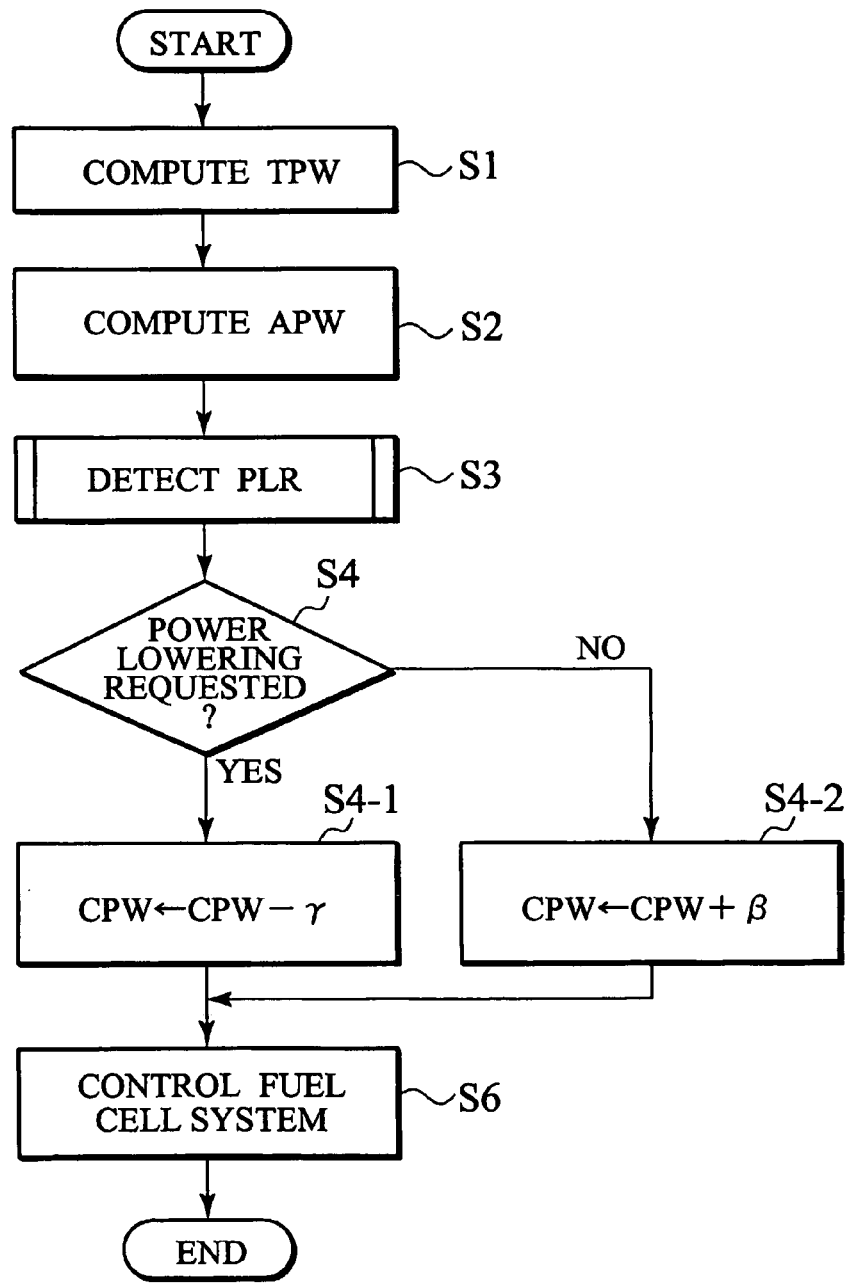
FIG. 12 is a control flowchart illustrating a basic process flow of an electric power generation control system of the fourth embodiment.

Processes in steps S1 to S4 and step S6 in FIG. 12 are identical to those shown in FIG. 3. In respect of process in step S3, process shown in either FIGS. 5, 8 or FIG. 10 may be applied.

As a result of determination in step S4, if no power-lowering request is found, process is routed to step S4-2 where process is executed such that extraction power CPW is set to be greater than previous extraction power, resulting from preceding computing step, by a predetermined value of β. However, the maximum value of extraction power CPW is set to be equal to target power TPW, and no power greater than target power TPW is extracted.

On the contrary, if it is determined in step S4 that the power-lowering request is present, process is routed to step S4-1 where process is executed such that extraction power CPW is set to be less than previous extraction power CPW resulting from preceding computation by a predetermined value of γ. However, the minimum value of extraction power CPW is treated to be equal to a product where available power APW resulting from computation in step S2 is subtracted from target power TPW.

Figure 13A:
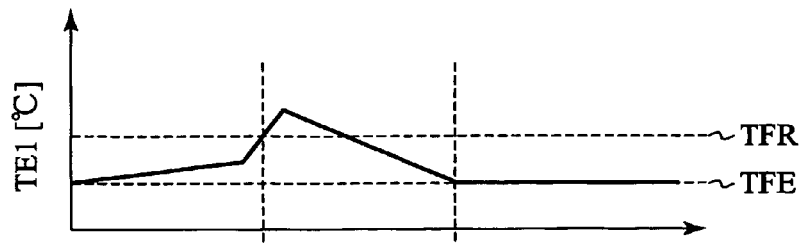
FIGS. 13A to 13E are timing charts illustrating operation of the electric power generation system of the fourth embodiment.
Figure 13B:
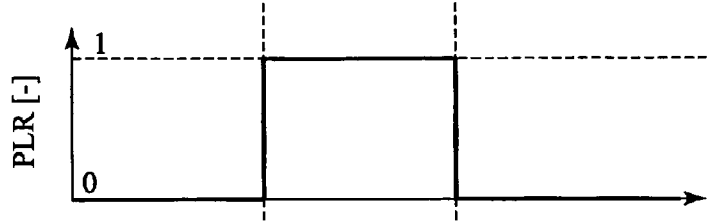
Figure 13C:
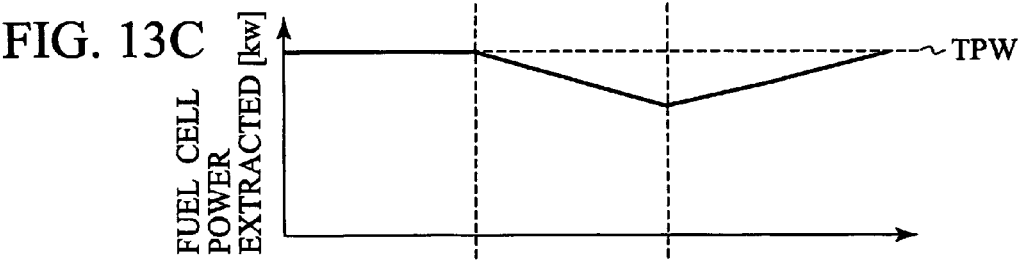
Figure 13D:
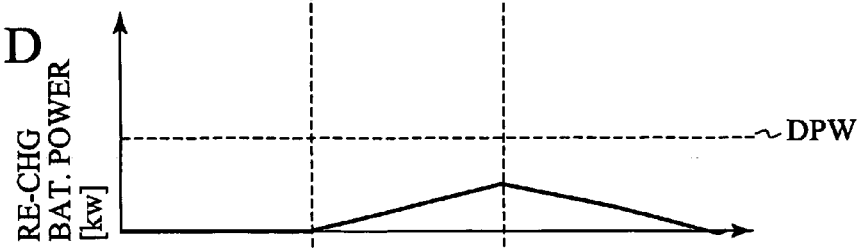
Figure 13E:
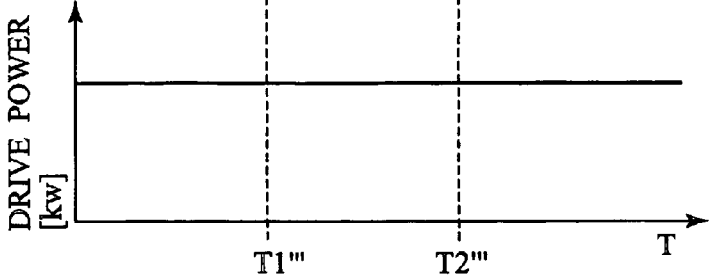

FIGS. 13A to 13E illustrate operations to be executed in the fourth embodiment. The operating sequence shown in FIG. 8 is applied to the fourth embodiment as the method of providing detecting power-lowering request in respect of step S3. FIG. 13A shows variation in the temperature TE1 of the combustor 27 in terms of time. In FIG. 13A, a lower broken line designates the threshold for ending request to lower power extraction TFE, and an upper broken line designates the threshold for requesting to lower power extraction TFR. FIG. 13B shows the presence of or the absence of the power-lowering request in terms of time. In FIG. 13B, a value "1" represents the presence of power-lowering request, and a value "0" represents the absence of the power-lowering request. FIG. 13C shows variation in fuel-cell extraction power CPW in terms of time. In FIG. 13C, a solid polygonal line represents extraction power CPW to be extracted from the fuel cell, and a broken line represents target power TPW. FIG. 13D shows variation in rechargeable battery power in terms of time. In FIG. 13D, a solid polygonal line represents actually discharged electric power, and a broken line represents dischargeable electric power DPW of the rechargeable battery. FIG. 13E shows variation in drive power in terms of time. FIGS. 13A to 13E totally show the relationship among the temperature TE1 of the combustor 27, the presence of or the absence of the power-lowering request, fuel cell extraction power, rechargeable battery power and drive power.

As shown in FIGS. 13A, 13B, when the temperature TE1 of the combustor 27 increases with the elapse of time and reaches the threshold for requesting to lower power extraction TFR at time T1''', the power-lowering request is executed. And as shown in FIGS. 13C, 13D, extraction power CPW is limited and the rechargeable battery compensates electric power by the amount of decrement equivalent to the resulting extraction power CPW. This decreases the load of the fuel cell, and the temperature TE1 of the combustor 27 gradually decreases. Then, as shown in FIGS. 13A, 13B, if the temperature TE1 of the combustor 27 drops to the threshold for ending request to lower power extraction TFE at time T2''', the power-lowering request is cancelled. At the same time, as shown in FIGS. 13C, 13D, the limit on fuel-cell extraction power CPW is cancelled, thereby terminating electric power to be compensated from the rechargeable battery. During this period, no adverse affect occurs in drive power of the vehicle as shown in FIG. 13E.

As will be appreciated from FIGS. 13A, 13B, with the fourth embodiment, by continuously lowering fuel-cell extraction power CPW to a value equal to available power APW of the rechargeable battery in dependence upon the extraction-power-lowering request, a capability of discharging rechargeable battery at a minimal enables to satisfy a demanded load without an adverse affect on drive power.

The present disclosure relates to subject matter contained in Japanese Patent Application No. 2003-106495, filed on Apr. 10, 2003, the disclosure of which is expressly incorporated herein by reference in its entirety.

The preferred embodiments described herein are illustrative and not restrictive, and the invention may be practiced or embodied in other ways without departing from the essential character thereof. The scope of the invention being indicated by the claims, and all variations which come within the meaning of claims are intended to be embraced herein.

INDUSTRIAL APPLICABILITY

In the present invention, the power-lowering request detection unit 102 is provided which detects power-lowering request of the fuel cell 3 regardless of the demanded load whereby in the presence of the power-lowering request, extraction power to be derived from the fuel cell 3 is limited, enabling the operating condition of the fuel cell 3 to be prevented from further deterioration caused by excessive amount of extraction power. Also, if the degree of deterioration in the operating condition of the fuel cell 3 remains little, the fuel cell system is not interrupted in operation to enable power output to be continuously extracted.

The invention claimed is:

1. A power generation control system for a fuel cell, comprising:
    a chargeable/dischargeable unit connected to the fuel cell, for being charged with electric power from the fuel cell and discharging electric power to a load;
    a target power computing unit for computing a target power to be generated by the fuel cell;
    a power-lowering request detection unit for detecting a power-lowering request to the fuel cell, comprising a cell voltage detection unit for detecting a cell voltage of the fuel cell, wherein the power-lowering request detection unit determines whether or not the power-lowering request is present based on the cell voltage detected by the cell voltage detection unit;
    an available power detection unit for detecting available power of the chargeable/dischargeable unit;
    a power extraction limiting unit for limiting electric power to be extracted from the fuel cell based on the power-lowering request detected by the power-lowering request detection unit and the available power detected by the available power detection unit; and
    a power extraction control unit for controlling electric power to be extracted from the fuel cell based on the target power computed by the target power computing unit and an output of the power extraction limiting unit,
    wherein, as the power-lowering request detection unit detects the power-lowering request, the power extraction limiting unit reduces electric power to be extracted from the fuel cell by an amount less than the available power of the chargeable/dischargeable unit.

2. The power generation control system for a fuel cell according to claim 1, wherein,
as the power-lowering request detection unit detects another power-lowering request, the power extraction limiting unit further reduces electric power to be extracted from the fuel cell.

3. The power generation control system for the fuel cell according to claim 1, wherein
the power extraction limiting unit keeps the electric power to be extracted from the fuel cell reduced until the cell voltage detected by the cell voltage detection unit is recovered to a predetermined voltage.

4. A power generation control system for a fuel cell, comprising:
a chargeable/dischargeable unit connected to the fuel cell, for being charged with electric power from the fuel cell and discharging electric power to a load;
a target power computing unit for computing a target power to be generated by the fuel cell;
a power-lowering request detection unit for detecting a power-lowering request to the fuel cell, comprising a temperature detection unit for detecting a cell temperature of the fuel cell, wherein the power-lowering request detection unit determines whether or not the power-lowering request is present based on the cell temperature detected by the temperature detection unit;
an available power detection unit for detecting available power of the chargeable/dischargeable unit;
a power extraction limiting unit for limiting electric power to be extracted from the fuel cell based on the power-lowering request detected by the power-lowering request detection unit and the available power detected by the available power detection unit; and
a power extraction control unit for controlling electric power to be extracted from the fuel cell based on the target power computed by the target power computing unit and an output of the power extraction limiting unit,
wherein, as the power-lowering request detection unit detects the power-lowering request, the power extraction limiting unit reduces electric power to be extracted from the fuel cell by an amount less than the available power of the chargeable/dischargeable unit.

5. The power generation control system for the fuel cell according to claim 4, wherein
the power extraction limiting unit keeps the electric power to be extracted from the fuel cell reduced until the cell temperature detected by the temperature detection unit drops below a predetermined temperature.

6. The power generation control system for the fuel cell according to claim 1, wherein
the power-lowering request detection unit comprises:
a purge gas combustor; and
a combustor temperature detection unit for detecting a temperature of the purge gas combustor, wherein the power-lowering request is provided based on the temperature detected by the combustor temperature detection unit.

7. The power generation control system for the fuel cell according to claim 6, wherein
the power extraction limiting unit keeps the electric power to be extracted from the fuel cell reduced until the temperature detected by the combustor temperature detection unit drops below a predetermined temperature.

8. The power generation control system for the fuel cell according to claim 2, wherein
the power extraction limiting unit increases the amount of reduction in electric power to be extracted from the fuel cell to the available power of the chargeable/dischargeable unit by a predetermined amount while the power-lowering request detection unit detects the power-lowering request, and the power extraction limiting unit decreases the amount of reduction in electric power to be extracted from the fuel cell by another predetermined amount while the power-lowering request detection unit detects no power-lowering request.

9. A method of controlling electric power to be generated by a fuel cell, the method comprising:
providing a chargeable/dischargeable unit for being charged with electric power from the fuel cell and discharging electric power to a load;
computing target power to be generated by the fuel cell;
detecting a power-lowering request to the fuel cell by detecting a cell voltage of the fuel cell and determining whether or not the power-lowering request of the fuel cell is present based on the detected cell voltage;
detecting available power of the chargeable/dischargeable unit;
limiting electric power to be extracted from the fuel cell based on the detected power-lowering request and the detected available power; and
controlling the electric power to be extracted from the fuel cell based on the computed target power and the action of limiting electric power to be extracted,
wherein, as the power-lowering request is detected, the electric power to be extracted from the fuel cell is reduced by an amount less than the available power of the chargeable/dischargeable unit.

10. A method of controlling electric power to be generated by a fuel cell, the method comprising:
providing a chargeable/dischargeable unit for being charged with electric power from the fuel cell and discharging electric power to a load;
computing target power to be generated by the fuel cell;
detecting a power-lowering request to the fuel cell by detecting a cell temperature of the fuel cell and determining whether or not the power-lowering request to the fuel cell is present based on the detected cell temperature;
detecting available power of the chargeable/dischargeable unit;
limiting electric power to be extracted from the fuel cell based on the detected power-lowering request and the detected available power; and
controlling the electric power to be extracted from the fuel cell based on the computed target power and the action of limiting electric power to be extracted,
wherein, as the power-lowering request is detected, the electric power to be extracted from the fuel cell is reduced by an amount less than the available power of the chargeable/dischargeable unit.

* * * * *